April 12, 1927.
W. W. MARSH
1,624,418
COLLISION SHIELD FOR VEHICLES
Filed Dec. 17, 1925
2 Sheets-Sheet 1
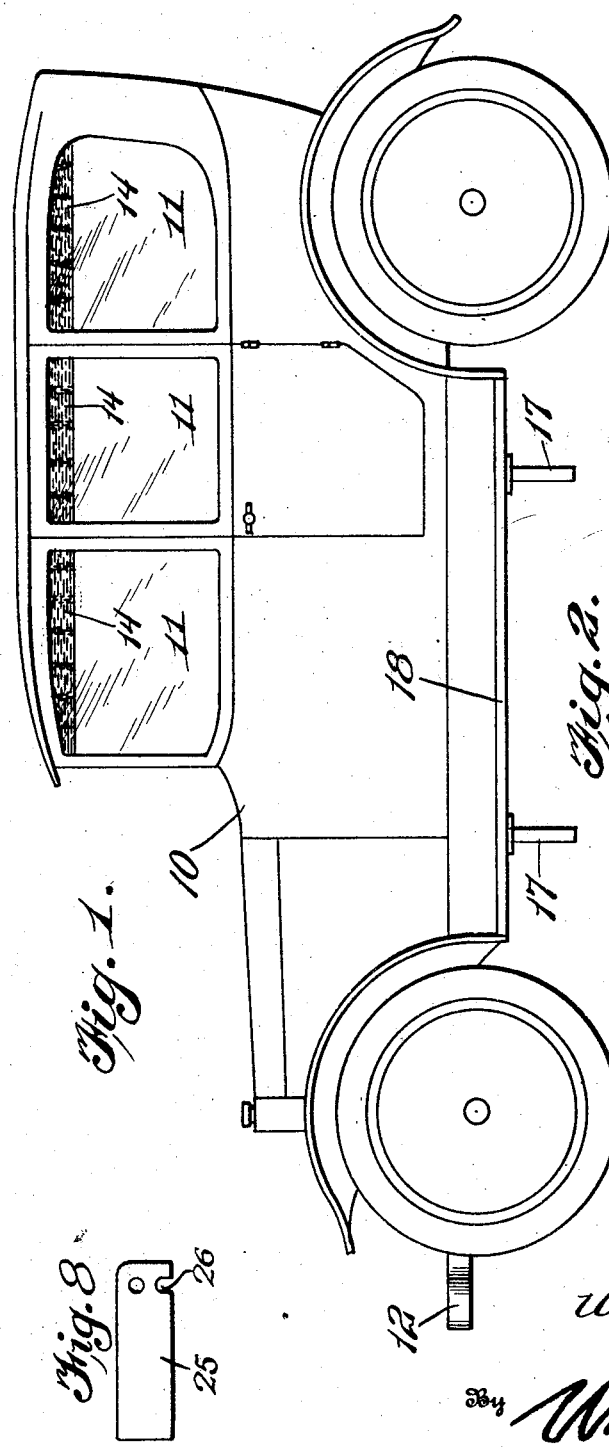
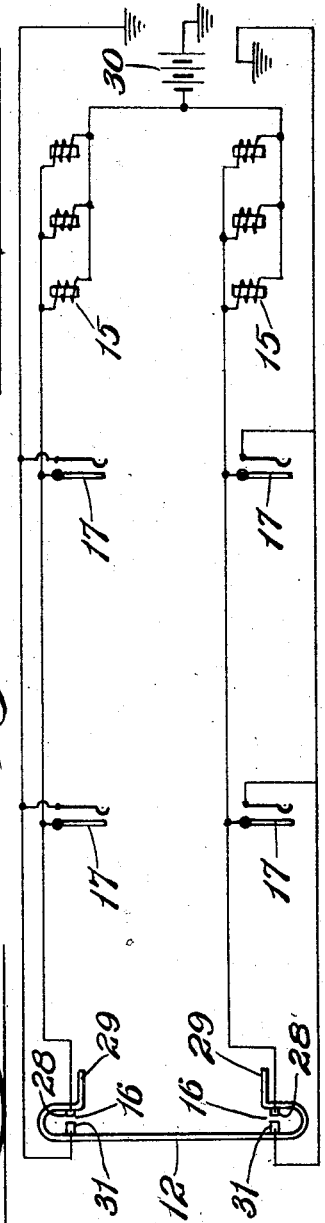
Inventor
W. W. Marsh
By Watson E. Coleman
Attorney

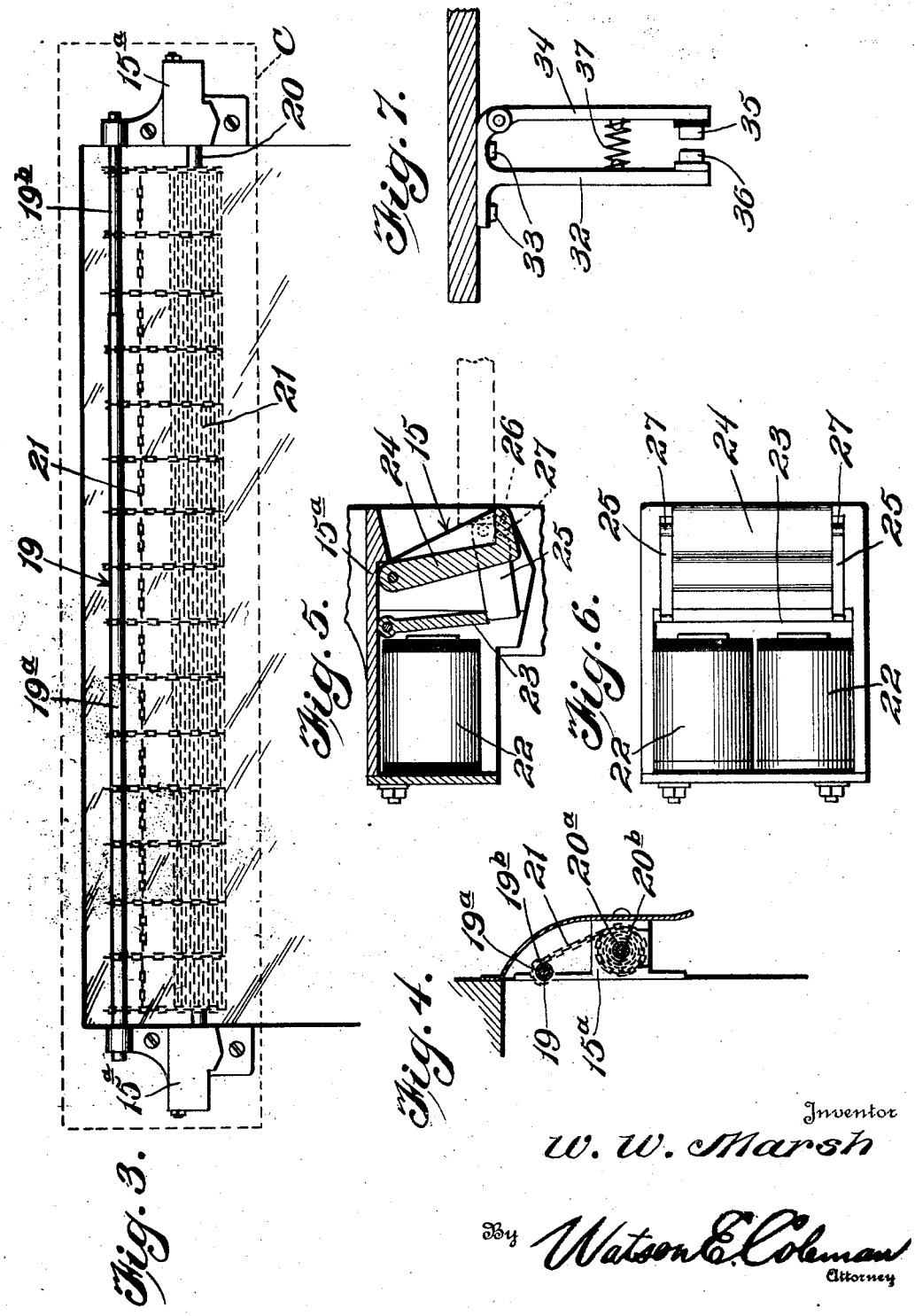

Patented Apr. 12, 1927.

1,624,418

UNITED STATES PATENT OFFICE.

WELLINGTON W. MARSH, OF LONG BEACH, WASHINGTON.

COLLISION SHIELD FOR VEHICLES.

Application filed December 17, 1925. Serial No. 76,042.

This invention relates to collision shields for vehicles and more particularly to a device adapted to be interposed between the occupant of the vehicle and the glass of windshields, doors or windows of the vehicle in event of collision.

An important object of the invention is to provide a device of this character which is automatically and instantaneously operated in event of collision.

A further and more specific object of the invention is to provide a device of this character which is electrically controlled and which includes a curtain shield released by collision and dropping between the curtain of the vehicle and the adjacent window.

A further object of the invention is to provide novel and improved means for actuating the electrical retaining elements of these curtains in event of collision.

These and other objects I attain by the construction shown in the accompanying drawings, wherein for the purpose of illustration is shown a preferred embodiment of my invention and wherein:—

Figure 1 is a side elevation of a vehicle embodying collision shields and actuating mechanism therefor constructed in accordance with my invention;

Figure 2 is a diagrammatic view showing the wiring circuit employed for the actuation of the electro-magnetic latches;

Figure 3 is an enlarged elevation of a collision shield showing the manner in which the shield is supported by the electro-magnetic latches;

Figure 4 is a vertical sectional view therethrough;

Figure 5 is an enlarged vertical sectional view through the electro-magnetic latch showing the structure thereof;

Figure 6 is a bottom plan view of the electro-magnetic latch;

Figure 7 is a side elevation of an inertia operated switch suitable for use in equipping the vehicle;

Figure 8 is a side elevation of the control lever of the electro-magnetic latch.

Referring now more particularly to the drawings, the numeral 10 generally designates a vehicle having glassed openings 11, which openings, of course, include the usual windshield located at the front of the vehicle. The vehicle is provided with a bumper element 12, at present shown as arranged at the front of the vehicle although it is, of course, understood that bumper elements may be provided both at the front and rear of the vehicle, if so desired. Associated with each window is a collision shield or curtain element 14, the structure of which will be hereinafter more particularly referred to. These curtain elements are normally maintained in inoperative position by electrically controlled latch elements 15 which are actuated by switches 16 and 17, hereinafter to be more particularly described. The switches 16 are associated with the bumper element or elements 12 while the switches 17 are preferably located upon the under surface of the running boards 18 of the vehicle.

The curtain element includes upper and lower rods 19 and 20 connected by a network of chain, as indicated at 21, this network in the inoperative position of the curtain being rolled upon the lower rod 20. The upper rod is suitably secured to the framework of the vehicle at the upper end of the glassed opening of the vehicle with which the curtain is to be associated in any suitable manner, it being, of course, understood that the supports for these rods must be changed in accordance with the character of the car to which they are applied. To enable the rods 19 and 20 to be applied to all makes of vehicles, it is necessary that these rods be made in telescopically engaged sections 19$^a$, 19$^b$, 20$^a$, 20$^b$, as illustrated. The electro-magnetic elements 15 preferably include casings 15$^a$ from which are supported a cover or hood enclosing the collision shield 14 when in inoperative position, as indicated at C.

As a means for retaining the rod in its elevated position, after the curtain has been rolled thereon, I provide electro-magnetic latches 15, hereinbefore referred to. These latches may be of any desired construction and at present are illustrated as including electro-magnets 22 having associated therewith armatures 23. A pivoted latching element 24 is provided for supporting the rod in its elevated position and associated with this latching element are pivoted levers 25 having notches 26 in which pins 27 carried by the latching elements 24 engage when the latching elements are in their latching position. As the latching elements move to their latching position, they move the outer ends of the levers 25 to a position permitting the armature 23 to swing therebehind so that the levers may not return and release the latching element until the electro-magnets 22 are actuated to withdraw the armature. When this occurs, the levers are released, permitting the latching element to swing downwardly and the end of the rod carried thereby to escape so that this rod drops, unrolling the curtain and placing the same in front of the glassed opening and between the glassed opening and the curtain of the vehicle.

The switches 16 hereinbefore referred to, when associated with the bumper 12, preferably consist of contact elements 28 supported from the rigid supports 29 of the bumper. The bumper is itself electrically connected by its attachment to the frame of the vehicle. In the usual battery circuit of automobiles, the battery 30 has one terminal thereof grounded to the frame so that the frame forms one side of the circuit with the result that if the bumper element be flexed inwardly so that it contacts with the contact 28, a circuit is established including the electro-magnets 22. If desired, completion of the circuit may be assured by providing the bumper proper with coacting contacts 31. It will be understood that a structure of this character will take care of any head-on collision and such a device might well be employed alone particularly where the car is of the touring car type and no glassed openings are provided with the exception of the windshield W thereof. It will also be understood that a similar bumper element 12 might be provided at the rear of the vehicle, as hereinbefore stated. Such a device alone, however, will not take care of collisions occurring where the colliding element strikes the side of the machine and since a side collision often results in overturning of the vehicle with the resultant breakage of the windshield, if this is the only glassed enclosure with which the vehicle is provided, I preferably provide the sides of the vehicle with inertia operating switching elements, heretofore generally designated at 17.

These switching elements include a contact support 32 having means, as at 33, whereby they may be rigidly secured to the running board or other portion of the vehicle. Associated with the arm 32 is a pivoted arm 34 bearing a contact 35 normally held in spaced relation to the contact 36 of the arm 32 by a light spring 37 or the like. The spacing of the contacts 35 and 36 is transversely of the vehicle with the result that in event of collision, in which force is applied transversely of the vehicle, the inertia of the pivoted arm 34 will cause this arm to overcome the action of the light spring 37 and bring the contacts 35 and 36 into engagement, closing the circuit for a sufficient interval to permit the actuation of the electromagnets 22 and accordingly application of the collision curtain 14. It will, of course, be understood that reversely arranged switch elements 17 will be disposed at opposite sides of the vehicle.

While I have heretofore described a specific application of my invention to a vehicle, it will, of course, be understood that this application is capable of a considerable range of change and modification without materially departing from the spirit of the invention and I accordingly do not limit myself to such specific structure except as hereinafter claimed.

I claim:—

1. In combination with a vehicle having a glassed enclosure, a collision shield associated with the enclosure at the inner face thereof including a curtain moving when released to interpose between an occupant of the vehicle and the enclosure, electromagnetic latches normally maintaining the curtain in inoperative position, a source of E. M. F. and collision operated switches for closing the circuit including said electro-magnetic latches and the source of E. M. F., the vehicle including a bumper, said switches including contact elements brought into engagement by flexure of the bumper under impact and inertia operated switches including contacts brought into engagement by impact transversely of the vehicle.

2. In combination with a vehicle having a glassed enclosure, a collision shield associated with the enclosure at the inner face thereof including a curtain moving when released to interpose between an occupant of the vehicle and the enclosure, electro-magnetic latches normally maintaining the curtain in inoperative position, a source of E. M. F. and collision operated switches for closing the circuit including said electromagnetic latches and the source of E. M. F., said switches including inertia switches having contacts brought into engagement by impact transversely of the vehicle.

3. In a vehicle, a shield having two positions, a restraining element for the shield normally maintaining it in one of said positions, the shield, when released, automatically moving to the other of said positions, a control for said shield including an inertia operated switch and a control circuit for said restraining element including said inertia operated switch.

4. In combination with a vehicle having a glassed enclosure, a flexible collision shield secured at one end adjacent the top of the enclosure, a rod upon which the shield is wound, means for supporting the rod comprising electro-magnetic latches disposed at opposite sides of the enclosure and receiving the ends of the rod and collision operated means for actuating the electro-magnetic latches to release the rod.

In testimony whereof I hereunto affix my signature.

WELLINGTON W. MARSH.